(12) United States Patent
Scherf et al.

(10) Patent No.: US 9,050,924 B2
(45) Date of Patent: Jun. 9, 2015

(54) TRUCK HAVING A MULTI-AXLE CHASSIS FOR TRANSPORTING, DEPOSITING AND RECEIVING ARTICLES

(71) Applicants: Wilfried Scherf, Hummelshain (DE); Michael Luddeneit, Hummelshain (DE)

(72) Inventors: Wilfried Scherf, Hummelshain (DE); Michael Luddeneit, Hummelshain (DE)

(*) Notice: Subject to any disclaimer, the term of this patent is extended or adjusted under 35 U.S.C. 154(b) by 111 days.

(21) Appl. No.: 13/723,457

(22) Filed: Dec. 21, 2012

(65) Prior Publication Data

US 2013/0164105 A1    Jun. 27, 2013

(30) Foreign Application Priority Data

Dec. 23, 2011   (DE) .................. 10 2011 057 043

(51) Int. Cl.
B60P 1/48    (2006.01)

(52) U.S. Cl.
CPC .. B60P 1/483 (2013.01); B60P 1/48 (2013.01)

(58) Field of Classification Search
CPC .................................. B60P 1/48; B60P 1/483
USPC .................................................. 414/546, 547
See application file for complete search history.

(56) References Cited

U.S. PATENT DOCUMENTS

| | | | | |
|---|---|---|---|---|
| 3,726,421 | A * | 4/1973 | Goldhofer | 414/547 |
| 3,868,029 | A * | 2/1975 | Goby | 414/550 |
| 6,881,021 | B1 * | 4/2005 | Winter et al. | 414/420 |
| 7,189,048 | B2 * | 3/2007 | Rinderknecht | 414/546 |

FOREIGN PATENT DOCUMENTS

| | | |
|---|---|---|
| DE | 8212392 U1 | 11/1982 |
| DE | 29810104 U1 | 11/1982 |
| DE | 3138643 A1 | 5/1983 |
| DE | 3405502 A1 | 8/1985 |
| DE | 8802216 U1 | 5/1988 |
| DE | 3818627 A1 | 12/1989 |
| DE | 19731584 A1 | 1/1999 |
| DE | 20007538 U1 | 7/2000 |
| DE | 10063616 A1 | 7/2002 |
| DE | 20113419 U1 | 11/2002 |
| EP | 1712412 A2 | 10/2006 |
| GB | 1300408 | 12/1972 |

OTHER PUBLICATIONS

Machine translation of DE 2007538, Jul. 20, 2007, Perlini, Bruno.*
International Search Report from PCT/DE2012/100389, filed Dec. 19, 2012, mailed Apr. 23, 2013.

* cited by examiner

*Primary Examiner* — Kaitlin Joerger
(74) *Attorney, Agent, or Firm* — Patentbar International, P.C.

(57) ABSTRACT

A truck with a multi-axle chassis for transporting, depositing and picking up an article, in particular, a working machine used particularly at selected track installations is disclosed. The chassis has in the rear region a loading platform which is rotatable relative to the chassis and has a swivelable telescopic boom. A loading surface located on the same level as the loading platform is arranged in front of the loading platform on the chassis and is outfitted with a loading system for transporting the article from the loading platform to the loading surface, and vice versa. The loading platform has the telescopic boom and a gear ring engaged with a drive motor for vertical rotation of the loading platform for enabling the telescopic boom to deposit and pick up the article in an area surrounding the truck.

15 Claims, 6 Drawing Sheets

TRUCK HAVING A MULTI-AXLE CHASSIS FOR TRANSPORTING, DEPOSITING AND RECEIVING ARTICLES

RELATED APPLICATIONS

This application claims priority to German Patent Application No. 10 2011 057 043.8, filed Dec. 23, 2011, which is incorporated herein by reference in its entirety.

FIELD OF THE INVENTION

The invention is directed to a truck having a multi-axle chassis for transporting, depositing and receiving articles, particularly for working machines to be dropped off or picked up at selected track installations.

BACKGROUND OF THE INVENTION

Numerous crane systems allowing loads to be moved are known from the prior art. Combining crane systems with a chassis, for example, a truck, makes it possible, in addition to picking up and depositing compact loads, to transport these loads over long distances to selected locations in a flexible manner. Accordingly, a loading and transporting system of this type does not depend on additional equipment such as cranes or forklifts, for example.

An established arrangement for moving particularly heavy loads is, for example, a swingloader superstructure such as is known from German Utility Model 298 10 104 U1. Swingloader superstructures are mounted on a chassis and are preferably provided for picking up, depositing and transporting standardized interchangeable containers. They have a horizontal loading platform and two hydraulically moving booms in the end region thereof which carry out a vertical swinging movement over the rear of the chassis. In this way, a load fastened between the ends of the booms can be picked up or deposited at the back over the longitudinal axis of the chassis. To stabilize the chassis during loading and unloading, extendable rear supports are arranged in the rear area of the loading platform and oppose the torque occurring as a result of the load to be set down to the rear of the final chassis axle. However, in order to deposit a load at a desired location, the use of the swingloader which swivels outward at the rear always requires a minimum movement space which corresponds to the dimensions of the chassis length, including the swiveled out boom, plus a maneuvering space. Therefore, it is not possible to deposit loads in poorly accessible locations. Further, because of the fastening to the two ends of the boom it is not possible to align the load by rotation around its vertical axis.

A solution requiring appreciably less space was published in German Utility Model 201 13 419 U1. Here, the principle of the swingloader is adapted for picking up and depositing a load lateral to the longitudinal axis of the chassis. For this purpose, a boom arranged at the front end and rear end of the loading platform executes a vertical swiveling movement laterally past the flank of the chassis. To absorb the load torque, the chassis has two lateral supports on the depositing side. These supports can be extended outward by a displacement device fastened to the chassis below the loading platform. In this solution also, it is impossible to align the load by rotation around its vertical axis owing to the fastening at the two ends of the boom.

Laid Open Application EP 1 712 412 A2 shows a possibility for aligning a load suspended at the boom by rotation around its vertical axis. While retaining the basic construction of a swingloader which moves the load by means of a swiveling movement over the rear of the chassis, a horizontally oriented cross member is fastened here between the ends of the boom. Two short bearing shafts are provided for receiving the cross member in the boom ends. The two bearing shafts are connected by a rotatable bearing bush to an angle element which is in turn fixedly connected to one or more extruded sections which connect the angles and form the cross member. A device for receiving the load is located in the middle of the cross member and is fastened to a vertical pivot axle. This receiving device is motor-driven so that the load can be rotated around its vertical axis by remote control. The center of gravity of the entire arrangement lies below the axis of rotation of the bearing bushes so that the receiving device always faces downward as a result of gravity. This receiving device provides a very convenient possibility for aligning a load in accordance with the local conditions at the unloading site, e.g., cramped conditions or access routes for further transport of the load. However, because of the swiveling movement over the rear end, it is necessary to align the chassis with the unloading site before unloading or picking up a load. However, the movement space described above is always required for this purpose. Further, the prior art is only designed for transporting an individual load and, in order to carry out the loading and unloading process, still requires the motor vehicle needed for transporting in the form of a tractor or truck on which the loading platform is built.

SUMMARY OF THE INVENTION

It is the object of the invention to find a possibility for transporting, depositing and picking up one or more articles, e.g., working machines which are used particularly at selected track installations, which allows articles to be picked up or set down with pinpoint accuracy with a chassis of a truck under confined access conditions with respect to a depositing site or pickup site without special alignment of the chassis to the track installation.

According to the invention, in a truck having a multi-axle chassis for transporting, depositing and picking up working machines or articles with a telescopic boom which is swivelable around a horizontal swivel axle and has two telescopic arms and with a rotatably supported cross member which is arranged in bearings between movable ends of the telescopic arms, and a load hook which is arranged in the center of the cross member and which has a bearing support which is freely rotatable around an axis orthogonal to the cross member, the above-stated object is met in that the chassis has a rear region which has the swivelable telescopic boom on a loading platform which is rotatable relative to the chassis around an axis of rotation, wherein a loading surface located on the same level as the loading platform is arranged in front of the loading platform on the chassis with respect to the driving direction and is outfitted with a longitudinal loading system for transporting the article from the loading platform to the loading surface, and vice versa, the loading platform has the telescopic boom with associated drives and a gear ring for rotation of the loading platform around the vertical axis of rotation, wherein a drive pinion of a drive motor is in meshing engagement with the gear ring and is rigidly fastened to the chassis so as to rotate the loading platform around the vertical axis of rotation.

In an advantageous embodiment, the loading platform has a control unit for limiting the movement space of the telescopic boom during a swiveling movement around a horizontal swivel axle, and the telescopic boom has an extension length that depends upon its swiveling angle, and an automatic height limiting of movable boom ends of the telescopic boom is adjusted for every selected swiveling angle by means of the control unit for limiting the movement space.

In a special embodiment, the drive motor for moving the loading platform is a fluid motor. Alternatively, the drive motor for moving the loading platform can also be constructed as an electric motor.

In a preferred embodiment of the invention, displacement measuring units for monitoring a maximum height in the movement space of the telescopic boom are provided at portions of the telescopic arms which move relative to one another and at linearly driving swivel cylinders for the telescopic arms, which swivel cylinders are provided for swiveling.

In a further variant, the displacement measuring units for sensing the extension length of the telescopic boom are arranged at the moving boom ends of the telescopic arms of the telescopic boom and displacement measuring units for sensing the swiveling angle of the telescopic boom are arranged at the linearly moving parts of the swivel cylinders of the telescopic arms.

The loading surface and loading platform advantageously have a mutually merging rollable loading system for moving the article which is constructed in a special embodiment as a mutually merging track-like rail system for longitudinal movement of the article on the truck, wherein the rail spacing is advisably adjustable.

In an advantageous embodiment, the chassis has an energy unit for autonomous operation of the loading platform, and the energy unit is a power generator provided for electrical operation of a hydraulic drive unit.

In an alternative variant, the chassis has an energy unit for autonomous operation of the loading platform, and the internal combustion engine of the truck can be used as energy unit for operating a hydraulic drive unit.

In a third variant, the chassis can also have an energy unit for autonomous operation of the loading platform in the form of a power generator which is provided for operating an electric drive at least for implementing the rotational movement of the loading platform.

The control unit for limiting the movement space of the telescopic boom advantageously has a position computation which is provided on the basis of an angle length control and angle length storage for desired depositing sites and pickup sites for depositing and picking up the article in an area surrounding the truck.

In a special embodiment, a memory unit stores depositing positions and pickup positions, extension lengths of the telescopic arms up to a maximum height, and depositing positions on the loading platform so that the stored positions can be retraced in a simple robotic manner for a subsequent sequence of movements of articles by means of the loading platform.

The control unit of the loading platform can advisably have a remote control with operator controls for all movement functions.

In another advantageous variant of the invention, at least one supporting device for stabilizing the chassis in the region of the loading platform when loading and unloading the article is arranged at the chassis in the vicinity of the axis of rotation below the loading platform, and the supporting device has vertically adjustable supporting feet which can be moved out on both sides transverse to the driving direction. A loading platform such as that which is substantially already known from German Utility Model 298 10 104 U1 is used for this purpose.

BRIEF DESCRIPTION OF THE DRAWINGS

The invention will be described more fully in the following with reference to embodiment examples. The drawings show.

DETAILED DESCRIPTION OF THE PREFERRED EMBODIMENTS

Figure 1:
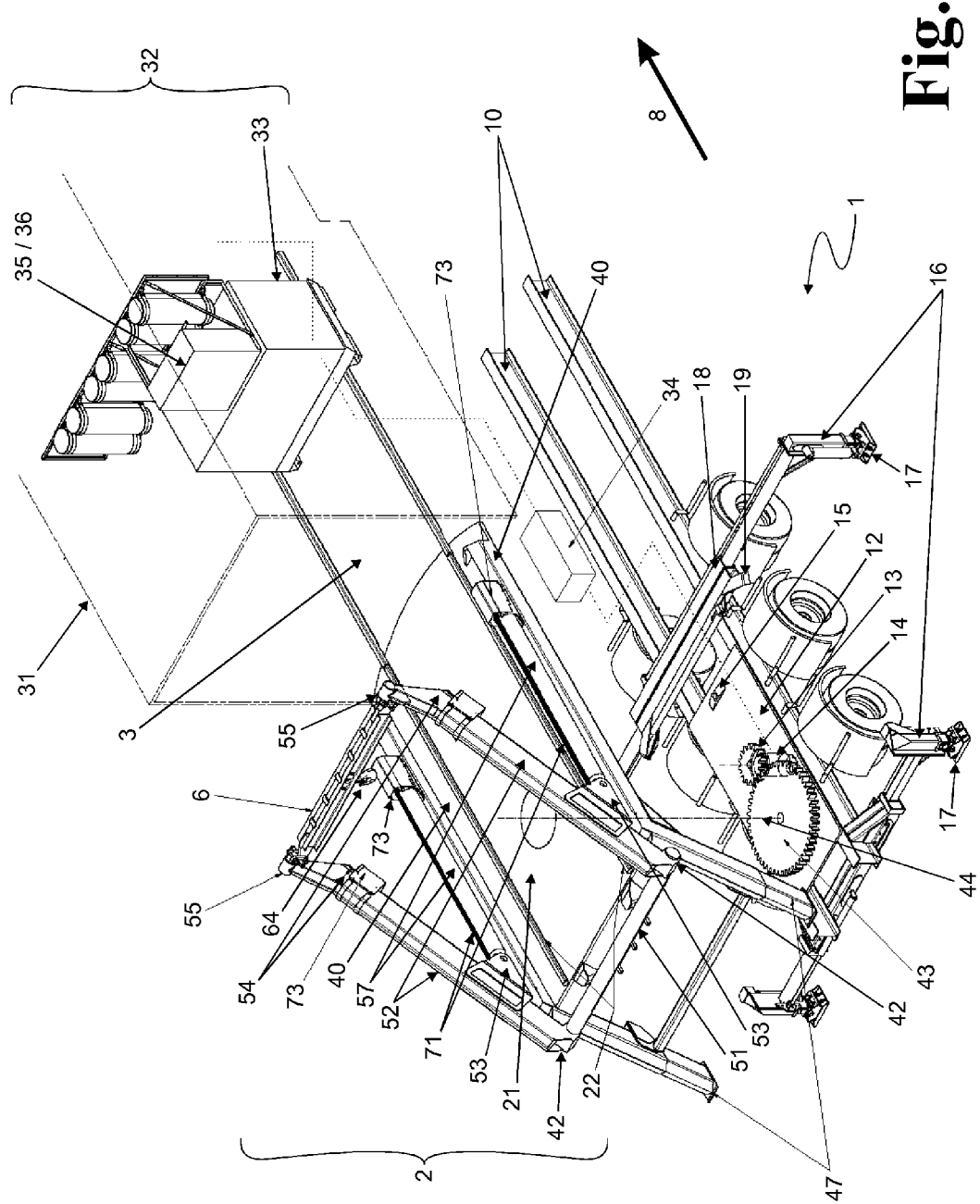
FIG. 1 the basic construction of a multi-axle chassis.

A multi-axle chassis 1 according to FIG. 1 has two longitudinal chassis members 10 oriented horizontally in the driving direction 8. These longitudinal chassis members 10 are arranged parallel to one another, symmetrically with respect to a vertical chassis center plane 11 which is extended in driving direction 8, and at a distance from one another which corresponds to the track width of the chassis 1. The chassis 1 has a front region oriented in driving direction 8 and a rear region oriented against the driving direction. A loading surface 3 is arranged in the front region and a loading platform 2 is arranged in the rear region.

The loading surface 3 has a rigid connection to the chassis 1 and forms a horizontal, plane, rectangular surface which has two longitudinal sides disposed parallel to the driving direction 8. A function unit 32 containing all of the control devices and supply devices for the loading platform is arranged on the forwardmost front region of the loading surface 3 in driving direction 8. The component parts of the function unit 32 include an energy unit 33, a drive unit 34 which can be constructed as a hydraulic, electric or pneumatic drive unit, and a control unit 35. A cover 31 enclosing the loading surface 3 is arranged in the region of the rectangular surface.

The loading platform 2 has a base frame 4 with two longitudinal members 40 forming the longitudinal sides of the loading platform 2. In a transporting position of the loading platform 2, these longitudinal members 40 are aligned parallel to and symmetric to the chassis center plane 11 (shown only in FIG. 3). Transverse connection elements (not shown) fixedly connecting the longitudinal members 40 are arranged transversely between the latter. At the underside facing the chassis 1, the base frame 4 has at the point corresponding to the center of gravity of the loading platform 2 a horizontally oriented gear ring 43 which is connected to the transverse connection elements. On the gear ring 43, the loading platform 2 is arranged on the chassis 1 so as to be rotatable relative to the chassis 1 around a vertical axis of rotation 44. In the region of the base frame 4 on the upper side of the transverse connection elements, the loading platform 2 likewise has a horizontally oriented rectangular depositing surface 21.

The axis of rotation 44 of the loading platform 2 piercing the center of the gear ring 43 is arranged in the chassis center plane 11 and, in the driving direction 8, in a position allowing the rotational movement of the loading platform 2 around the rear region of the chassis 1. Opposite the gear ring 43, a carrier plate 12 which is fixedly connected to the chassis 1 and receives the bearing of the gear ring 43 is arranged in the rear region of the chassis 1. A drive motor 14 engages in the gear ring 43 by a drive pinion 13 paraxial to the axis of rotation 44. The drive motor 14 has a connection to the drive unit 34 and is likewise arranged on the carrier plate 12.

Figure 2:
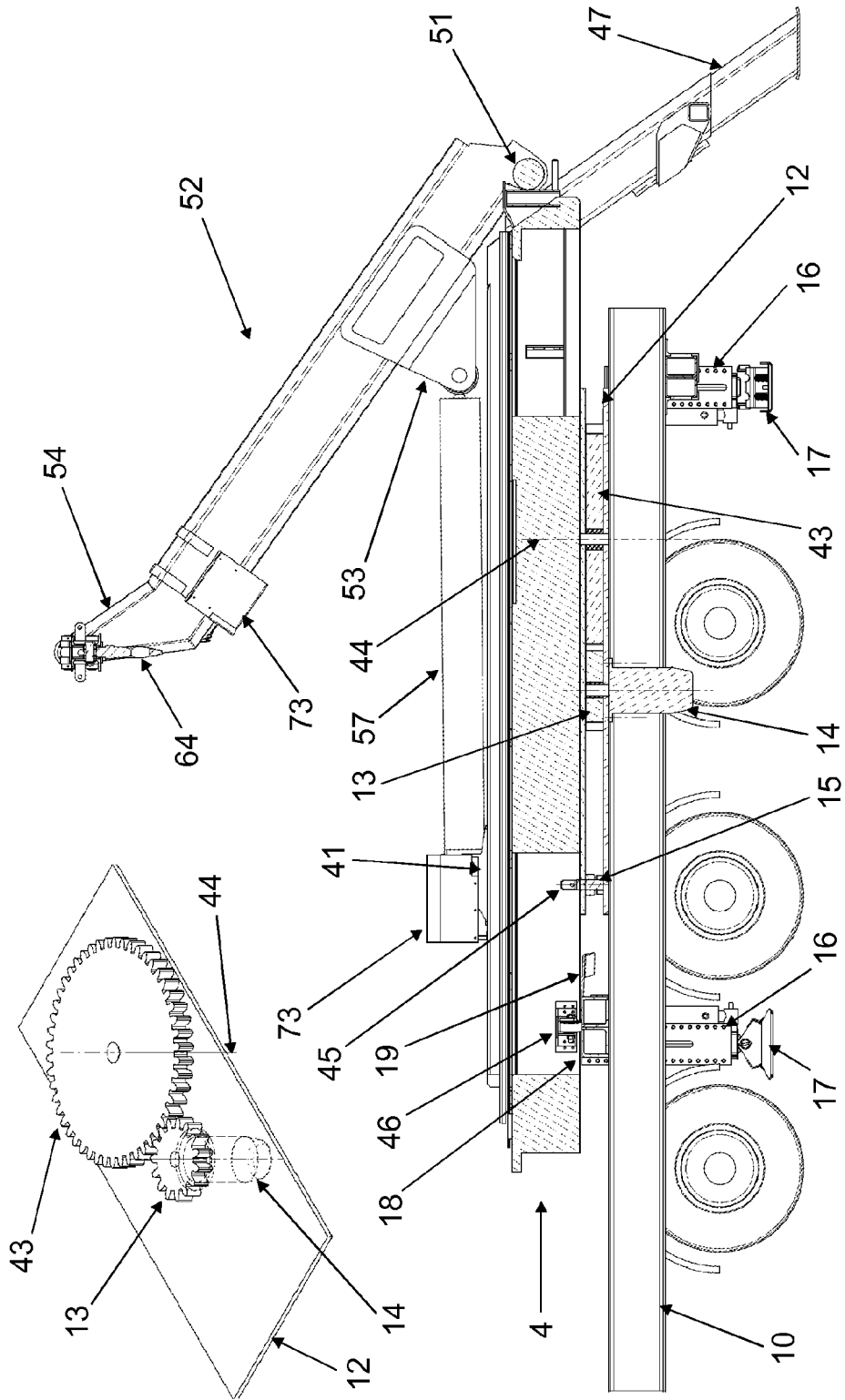
FIG. 2 a detailed view of the rear region of the chassis with a section through the center plane of the chassis.

In the front region of the loading platform 2 facing in the driving direction 8 in the transporting position of the loading platform 2, the base frame 4 has a vertically arranged securing pin 45 in the chassis center plane 11 as is shown in FIG. 2. Opposite this securing pin 45, a pin bearing 15 receiving the securing pin 45 is arranged at the same axial position on the carrier plate 12.

Also in the front region, the loading platform 2 has at its underside two running rollers 46 arranged equidistant from the axis of rotation 44. Opposite the running rollers 46, a running surface 18 is arranged in the region of the chassis 1 below the loading platform 2. The running surface 18 is arranged on the chassis 1 orthogonal to the driving direction 8 corresponding to the radius of the running rollers 46 and has at its lateral ends a runup ramp 19 angled in direction of the ground.

On the surface of the base frame 4 remote of the chassis 1, a rectangular depositing surface 21 filling out the base frame 4 is arranged between the longitudinal members 40. The depositing surface 21 has a fixed connection to the transverse connection elements of the base frame 4 and is arranged at the same height as the loading surface 3. Symmetric to the chassis center plane 11 in driving direction 8, the loading surface 3 and depositing surface 21 have a mutually merging track-like rail system 22 with an adjustable track width and, in parallel adjacent thereto, two depositing bars 23 arranged at the same height as the rail system.

At the end of the rear region outside of the footprint of the chassis 1, the ends of the longitudinal members 40 of the base frame 4 which are oriented against the driving direction 8 each terminate in a swivel bearing 42. A telescopic boom 5 associated with the loading platform 2 is arranged in the swivel bearings 42. The telescopic boom 5 has two telescopic arms 52 which are rigidly connected to a swivel axle 51 and aligned parallel to one another in a plane extending through the swivel bearings 42. The telescopic arms 52 are arranged in alignment with the longitudinal members 40. The swivel bearings 42 are oriented orthogonal to the longitudinal members 40 and horizontal to the ground.

A swivel cylinder 57 is arranged in each instance along the upper sides of the longitudinal members 40 also so as to be aligned with the latter. The swivel cylinders 57 have an articulated connection to the longitudinal members 40 and to the telescopic arms 52. A bearing block 41 is provided as a front joint considered in driving direction 8 and a fitting 53 of the telescopic arm 52 is provided as a rear joint. The bearing block 41 is arranged in the front region on the upper side of the longitudinal member 40. The bearing of the fitting 53 faces the longitudinal member 40 and is arranged in the half of the telescopic arm 52 facing the swivel bearing 42. In the transporting position, the swivel cylinders 57 are in a parallel position with respect to the upper sides of the longitudinal members 40, the telescopic boom 5 being in its forwardmost position over the loading platform 2.

The ends of the telescopic arms 52 opposed to the swivel bearings 42 are constructed as extendable boom ends 54 and have in each instance at the outer tips a bearing bush 55 for a rotatably supported mounting stud 56. A cross member 6 connecting the boom ends 54 is arranged between the mounting studs 56. The cross member 6 is connected to the mounting studs 56 by fastening lugs 61 arranged pairwise at the mounting studs 56. A load hook 64 which is supported so as to be rotatable around its vertical axis is arranged in the middle of the cross member 6, its axis of rotation being oriented orthogonal to the cross member. The load hook 64 and cross member 6 are aligned in a swinging manner between the telescopic arms 52 of the telescopic boom 5 depending on gravity.

A displacement measuring unit 7 connected to the control unit 35 is arranged at the relatively moving portions of the swivel cylinders 57 and telescopic arms 52 at the housings thereof. The displacement measuring unit 7 has a path measuring sensor (not shown) which is arranged at the part of the swivel cylinders 57 and telescopic arms 52 that is stationary at a given time. A measuring cable 71 is provided for connecting the path measuring sensors to the moving parts of the swivel cylinders 57 and telescopic arms 52. A cable clamp 72 is provided for fastening the measuring cable 71 to the moving parts.

In a rearward extension of the longitudinal members 40, the ends thereof have an extendable rear support 47 below the swivel bearings 42. The rear support 47 is angled rearward by approximately 45° from the perpendicular against the driving direction 8 so that the rear support 47 can be placed upon the ground at an inclination.

The multi-axle chassis 1 shown in FIG. 1 is constructed as a semitrailer. The forwardly oriented loading surface 3 and the rearwardly oriented loading platform 2 which is outfitted with the telescopic boom 5 and is rotatable around the rear region are fastened to the chassis 1 which is oriented in the driving direction 8. The loading surface 3 and depositing surface 21 of the loading platform 2 are positioned at the same height. In this connection, commercially available superstructures, e.g., swingloaders with telescopic arms by the Meiller company (without the tipping function provided for series production) can be used for the loading platform 2.

Figure 3:
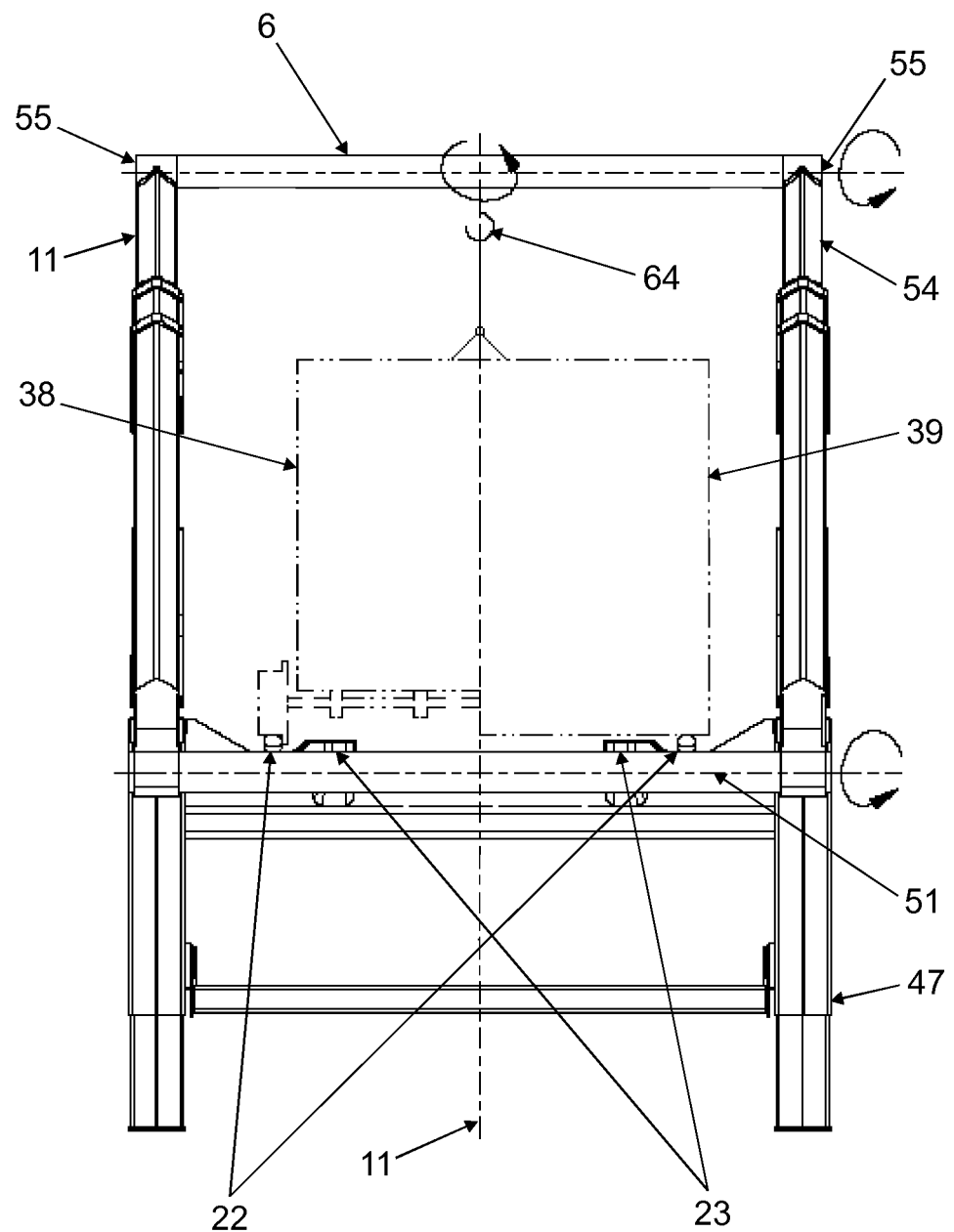
FIG. 3 possibilities for receiving loads on the loading platform.

To pick up work machines 33 which are used in track construction and provided with disk wheels which are movable along a track, the loading surface 3 and the depositing surface 21 are provided with a mutually merging track-like rail system 22 having an adjustable track width. As is shown in FIG. 3, one or more work machines 38 can be deposited on the rail system 22 by their disk wheels. Further the rail system 22 provides a simple and fast safeguarding during transportation in that the disk wheels of the work machines 38 are fastened to the rail system 22 by quick release devices (not shown). Further, the rail system 22 facilitates maneuvering of the work machine 38 from the loading surface 3 to the depositing surface 21 of the loading platform 2, and vice versa. The loading surface 3 is provided with a cover 31 in the form of a tarpaulin or closed box structure in order to protect the work machine 38 from the environment.

In an advantageous embodiment, the semitrailer can also be used for transporting common articles 39 such as pallets or containers. To this end, the loading surface 3 and depositing surface 21 are provided with depositing bars 23 which run parallel to the rail system 22 and are situated at the same height as the rail system 22 and along which articles 39 can be pushed onto the loading surface 3 or loading platform 2. It is also possible to use auxiliary racks provided with wheel axles for receiving and fastening common loads which facilitate maneuvering of these articles 39.

To pick up the working machine 38 from a track installation, not shown, the rear region of the semitrailer is parked in the immediate vicinity of a track installation by a tractor. Thanks to the rotatable loading platform 2, no maneuvering means are required for this purpose. By means of the energy unit 33, the loading platform 2 can be operated autonomously without depending on the presence of the tractor which would otherwise be required for supplying energy and media. Therefore, the semitrailer can also remain at a use site for longer periods without the tractor being bound to the use site.

The function unit 32 mounted on the loading surface 3 is located in the front region of the loading surface 3 for autonomously supplying the semitrailer. The function unit 32 comprises the following components: energy unit 33, work unit 34 and control unit 35. The drive unit 34 is hydraulic and substantially comprises a pump as hydraulic pressure generator and, for driving the loading platform 2, the drive motor 14 constructed as a fluid motor, the swivel cylinders 57 and telescopic arms 52, and the supporting devices 47 and 16 as hydraulic pressure consumers. The control unit 35 comprises a memory unit and an operator unit 36 with a wired or wireless remote control 37 for all movement functions. The drive unit 34 and control unit 35 are supplied with electrical energy by the energy unit 33.

In special embodiments, the drive unit 34 can also be replaced by an electric drive unit or pneumatic drive unit.

When using a hydraulic or pneumatic drive unit 34, it is also conceivable to replace only individual hydraulic or pneumatic drives of the loading platform 2 with electric drives. In particular, the fluid motor 14 used for the rotational movement of the loading platform 2 can be replaced by an electric motor. To this end, the electrical energy generated by the energy unit 33 is used for directly supplying electric drives.

It is also possible to modify the above-described construction of the semitrailer in an analogous manner directly as a chassis 1 of a truck. The additional units such as energy unit 33 or drive unit 34 of the chassis 1 described above can be rendered superfluous by the internal combustion engine and hydraulic and/or pneumatic system of the truck, but the truck is then permanently bound to the use site as primary energy unit 33.

Figure 4:
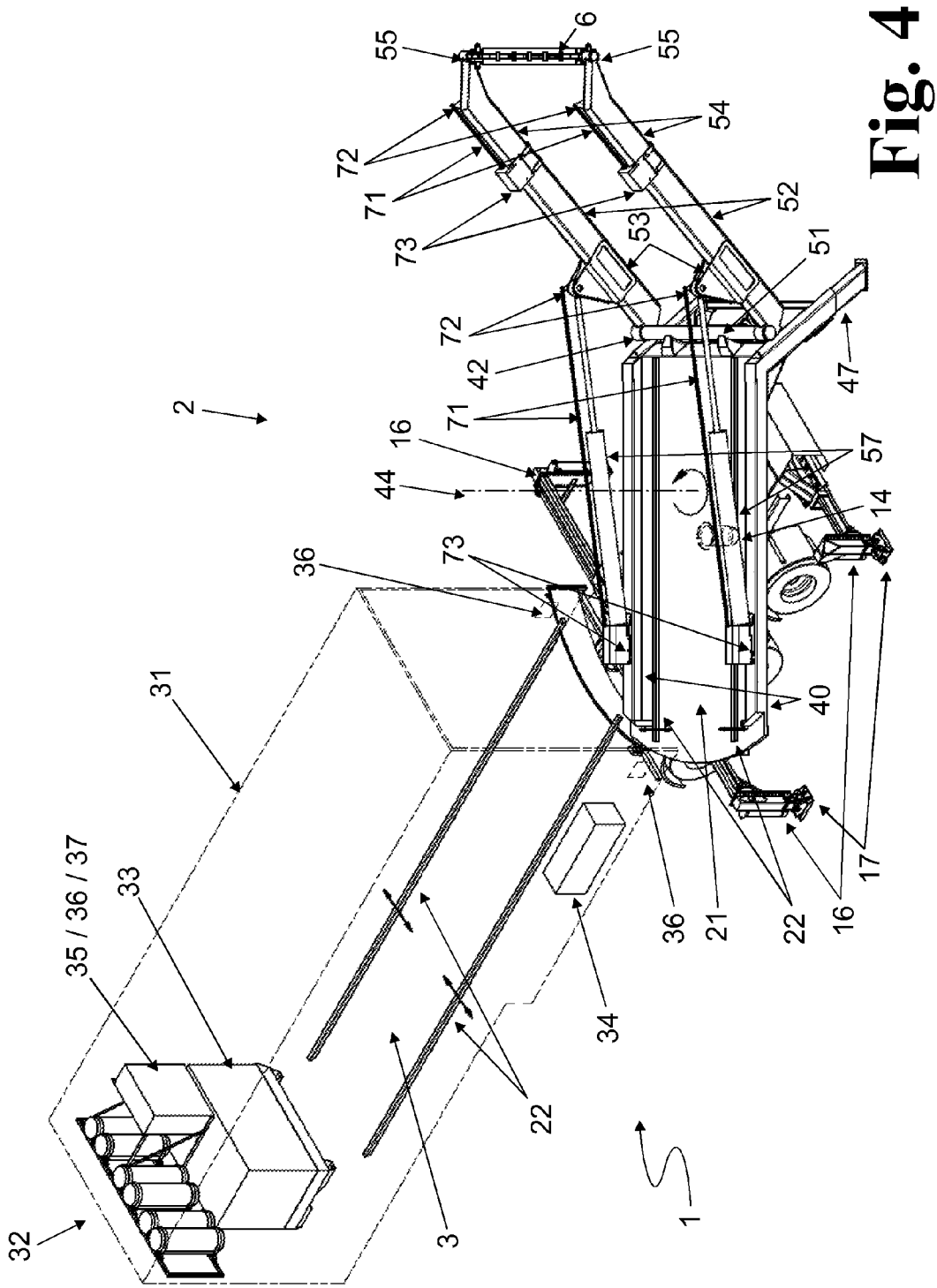
FIG. 4 a loading platform which is rotated around the rear region of the chassis.

As is shown in FIG. 4, the loading platform 2 can be rotated around the rear region of the chassis 1 in the direction of the track installation from the transporting position into a loading position, e.g., for picking up the working machine 38, not shown. To this end, the securing pin 45 securing the transporting position is removed from the pin bearing 15. The working machine 38 is then located in a position midway between the telescopic arms 52 in the swiveling region of the telescopic boom 5.

For rotation, the base frame 4 of the loading platform 2 is connected at the underside to the horizontally arranged gear ring 43. By means of a large rolling element bearing such as is used, e.g., as a pivot bearing in excavating machines, the gear ring 43 is rotatably supported on and connected to the carrier plate 12 fastened to the chassis 1. The rotation axis 44 of the bearing is arranged vertically in the chassis center plane 11. The position of the rotation axis 44 in the driving direction 8 is selected in such a way that a rotational movement of the loading platform 2 at an angle limited by the chassis 1 can be carried out around the rear region of the chassis 1. In the initial position of the telescopic arms 52 (fully retracted condition), the loading platform 2 can be rotated starting from the transporting position (rotational angle=0°) in a rotational angle range of ±105° to both sides of the chassis 1. Compliance with the limits of the rotational angle range is monitored by angle sensors (not shown) which are arranged opposite the circumferential surface of the gear ring 43. The fluid motor 14 used for the rotating movement rotates with its drive pinion 13 parallely adjacent to the axis of rotation 44 of the gear ring 43. This drive pinion 13 is arranged in the chassis center plane 11 in meshing engagement with the gear ring 43 and so as to be located ahead of the gear ring 43 in driving direction 8. The fluid motor 14 is likewise mounted on the carrier plate 12.

The telescopic boom 5 arranged at the end of the loading platform 2 comprises two telescopic arms 52 which are rigidly connected to a swivel axle 51 so as to extend parallel to one another in a plane. The swivel axle 51 is movably received in the two swivel bearings 42 at the end of the longitudinal member 40. The telescopic boom 5 can be swiveled around the swivel axle 51 from a position located above the loading platform 2 to a position outside the footprint of the loading platform 2. The boom ends 54 of the telescopic arms 52 can be slid out to lengthen the telescopic boom 5. The telescopic arms 52 are moved by swivel cylinders 57 to swivel out the telescopic boom 5. The swivel cylinders 57 are received in an articulated manner between the longitudinal member 40 and the telescopic arms 52. The swivel cylinders 57 are received in an articulated manner in bearings, all of which are oriented parallely adjacent to the swivel bearings 42 of the telescopic boom 5. The front bearing in each instance is a bearing block 41 which is arranged in the front region of the longitudinal members 40 on the upper side thereof. The rear bearing in each instance is arranged at the fittings 53 of the telescopic arms 52. During a swiveling movement of the telescopic boom 5, the telescopic arms 52 with the extendable boom ends 51 and the swivel cylinders 57 driving the telescopic arms 52 execute a movement in a vertical plane extending through the longitudinal axes of these parts.

Figure 5:
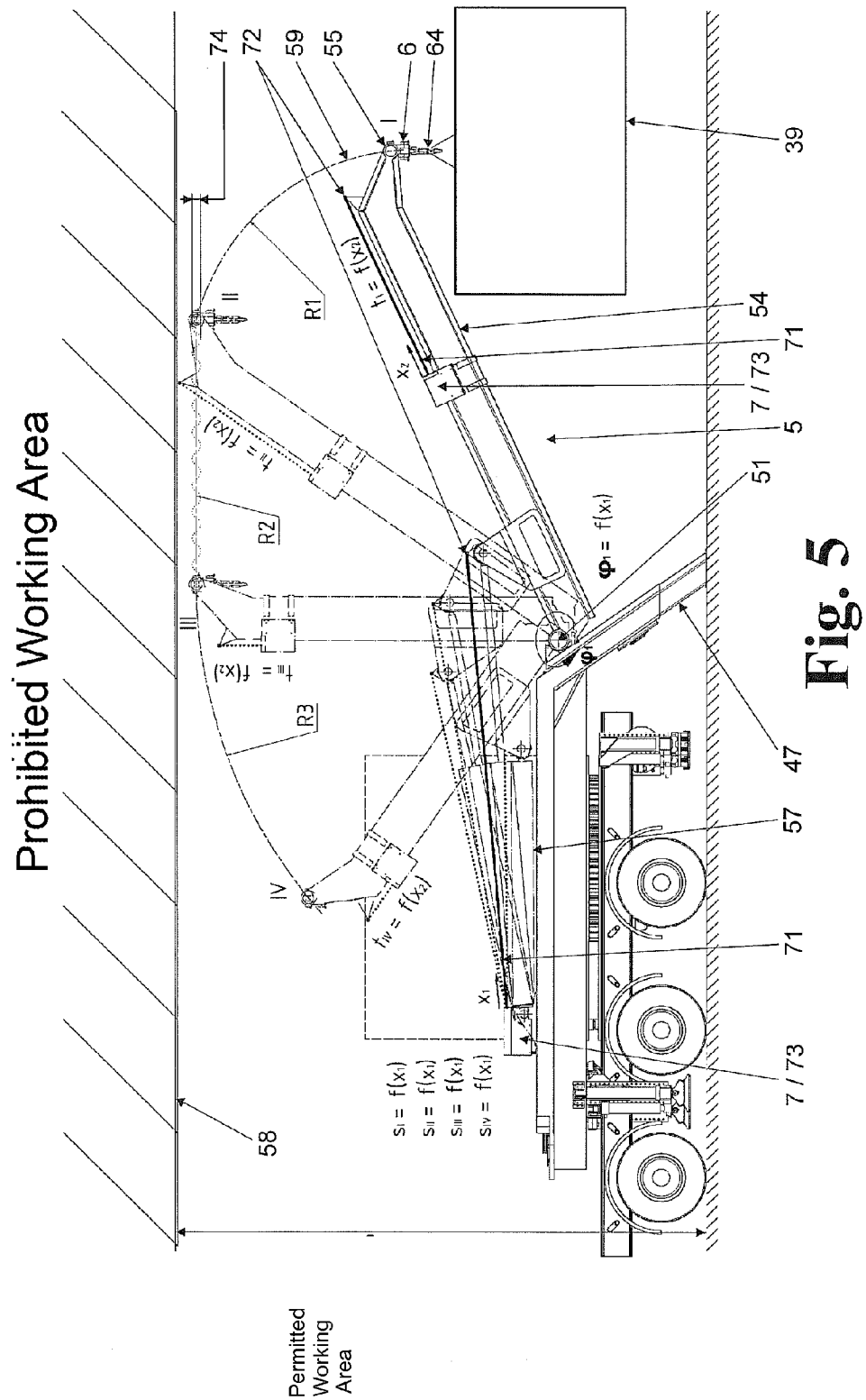
FIG. 5 the course of an exemplary curved path of the end of the telescopic boom during a swivel-out movement.

In order to maintain a safety distance with respect to overhead lines located above the track installations, the extension of the telescopic arms 52 is limited to a maximum height 58 when swiveling out the telescopic boom 5. Accordingly, a curved path 59 of the tips of the boom ends 54 which is shown in FIG. 5 has a flattened middle region complying with the maximum height 58. The control unit 35 monitors compliance with the curved path 59. For this purpose, the control unit 35 is connected to four displacement measuring units 7 (concealed by the protective plates 73 in FIG. 5) which can sense the linear travel of the moving parts of the telescopic boom 5.

The displacement measuring units 7 are implemented by means of a cable pull system. The cable pull system is fastened between the moving and stationary parts of the swivel cylinders 57 and telescopic arms 52. Further, a path measuring sensor (concealed by the protective plate 73 in the drawings) is fastened in each instance to the upper side of the housing of the bearing block 51 in the vicinity of the bearing block 41 (concealed by the protective plates 73 in the drawings) receiving the swivel cylinder 57, and a cable clamp 72 is fastened to the joint of the swivel cylinder 57 received at the fitting 53 of the telescopic arm 52. The path measuring sensor is fastened in each instance to the telescopic boom 5 in the region of the stationary part of the telescopic arm 52 facing the boom end 54, and the cable clamp 72 is fastened to the moving boom end 54. The measuring cable 71 which is highly flexible and stable with respect to length is wound on a precision spool (concealed by the protective plate 73 in the drawings) which is connected to a path measuring sensor adapted to the measuring job at hand. The precision spool has a spring (not visible) for keeping the measuring cable 71 taut and for generating a return force. The path measuring sensors are enclosed by a surrounding protective plate 73 to protect against damage.

The displacement measuring units 7 determine the linear travel of the parts of the swivel cylinders 57 and telescopic arms 52 moving relative to one another. The detected linear travel of the swivel cylinders is converted by the control unit 35 into a swiveling angle $\phi$ of the telescopic boom 5 by angular relationships. Depending on this swiveling angle $\phi$, the extension length of the boom ends 54 are readjusted so that the permissible maximum height 58 is maintained during the swivel-out movement. The maximum height 58 can be predefined by the control unit 35 via the operator unit 36.

The curved path 59 shown in FIG. 5 shows an exemplary movement sequence of the telescopic boom 5 when picking up the article 39 held on the load hook 64. The telescopic boom 5 with extended boom ends 52 is in a position I in which it is swiveled out over the rear region. Corresponding to the extension length, the measuring cables 71 of the displacement measuring units 7 are also extended so that the path measuring sensors detect a measurement value corresponding to the current rotational position of the precision spools.

The first portion of the swivel-in movement is carried out on a circular path R1 around the swivel bearing 42 with unchanged extension length of the telescopic boom 5. When the selected maximum height 58 is reached at position II, a retracting movement of the telescopic arms 52 depending on the swiveling angle $\phi$ of the telescopic boom 5 is carried out in addition to the swivel-in movement. In so doing, the measuring cable 71 is also driven by the return force of the above-mentioned spring so as to wind onto the precision spool. The change in the measured value detected by the path measuring sensor is evaluated by the control unit 35 simultaneous with the retracting movement so that as the swivel-in movement continues a continuous readjustment of the extension length can take place within a small adjustment range 74. This gives rise to the flattened region R2 between position II and position III in the curved path 59.

Depending on the position in which the article 39 is deposited on the depositing surface 21 of the loading platform 2, the telescopic boom 5 can either be moved on a circular path R3 into its end position at position IV or, after reaching the perpendicular analogous to the height-limited retracting movement, can also be extended, again with limited height until the article 39 is deposited at the desired location on the loading platform 2 and the telescopic boom 5 can be moved into its end position at position IV.

The memory unit integrated in the control unit 35 makes it possible to temporarily store complete swivel-out movements of the telescopic boom 5 once they have been carried out manually. These complete swivel-out movements include the position of the working machine 38 on the loading platform 2, the height-limited curved path 58 of the telescopic boom 5, and the pickup position or depositing position of the working machine 38 on the track installation or on the ground surrounding the semitrailer. After being stored, the swivel-out movement can be repeated automatically as often as desired at this use site if the position of the chassis 1 (e.g., of a semitrailer without tractor) has not been changed. The stored swivel-out movement is initiated by the operator to be carried out automatically while taking into account the maximum height 58.

As a result of the height-limited swivel-out movement of the telescopic boom 5, the pickup and depositing process can also be accelerated in that the rotational movement of the loading platform 2 and the swivel-out movement of the telescopic boom 5 are carried out at the same time.

The operator unit 36 is arranged at the control unit 35 for manually moving the loading platform 2. All drives of the loading platform 2 can be operated from the loading surface 3 by means of the operator unit 36. It is also possible to control the loading platform 2 via a wired or wireless remote control 37 connected to the operator unit 36. Therefore, the loading platform 2 can also be operated from a position outside of the semitrailer. This allows improved monitoring on the part of the operator because the operator can remain in the immediate region of the loading platform 2 during the pickup and depositing process.

The loading platform 2 is prevented from tipping over when the swivel-out movement of the telescopic boom 5 reaches far out over the footprint of the chassis 1 or when picking up or depositing a working machine 38. For this purpose, the rear supports 47 arranged at the rear ends of the longitudinal members 40 of the loading platform 2 are moved out hydraulically until they support the loading platform 2 fixedly on the ground. Therefore, a torque which results from the weight force of the telescopic boom 5 or of the working machine 38 being picked up and which acts on the rear axle of the chassis 1 can be supported at the ground by the rear supports 47.

In an advantageous embodiment, additional lateral supports 16 are provided in addition to the rear support 47 of the loading platform 2. These lateral supports 16 are fixedly connected to the chassis 1 in the region of the loading platform 2. In the transporting position, the lateral supports 16 occupy a retracted position at a distance from the ground and within the perimeter of the chassis 1.

The upward facing surface of a housing which receives the lateral supports 16 and is fastened to the chassis 1 simultaneously forms the running surface 18 for the running rollers 46 of the loading platform 2. In the loading position, the lateral supports 16 can move out over the perimeter of the chassis 1 horizontally and orthogonal to the driving direction 8. The supporting feet arranged at the outer ends can be moved out in direction of the ground and supported on the ground. The lateral supports 16 are arranged pairwise so that the chassis 1 is supported on both sides. Lateral supports 16 arranged in the rear region behind the rotation axis 44 of the loading platform 2 are so configured that they do not restrict the movement space of the rotatable loading platform 2.

Figure 6:
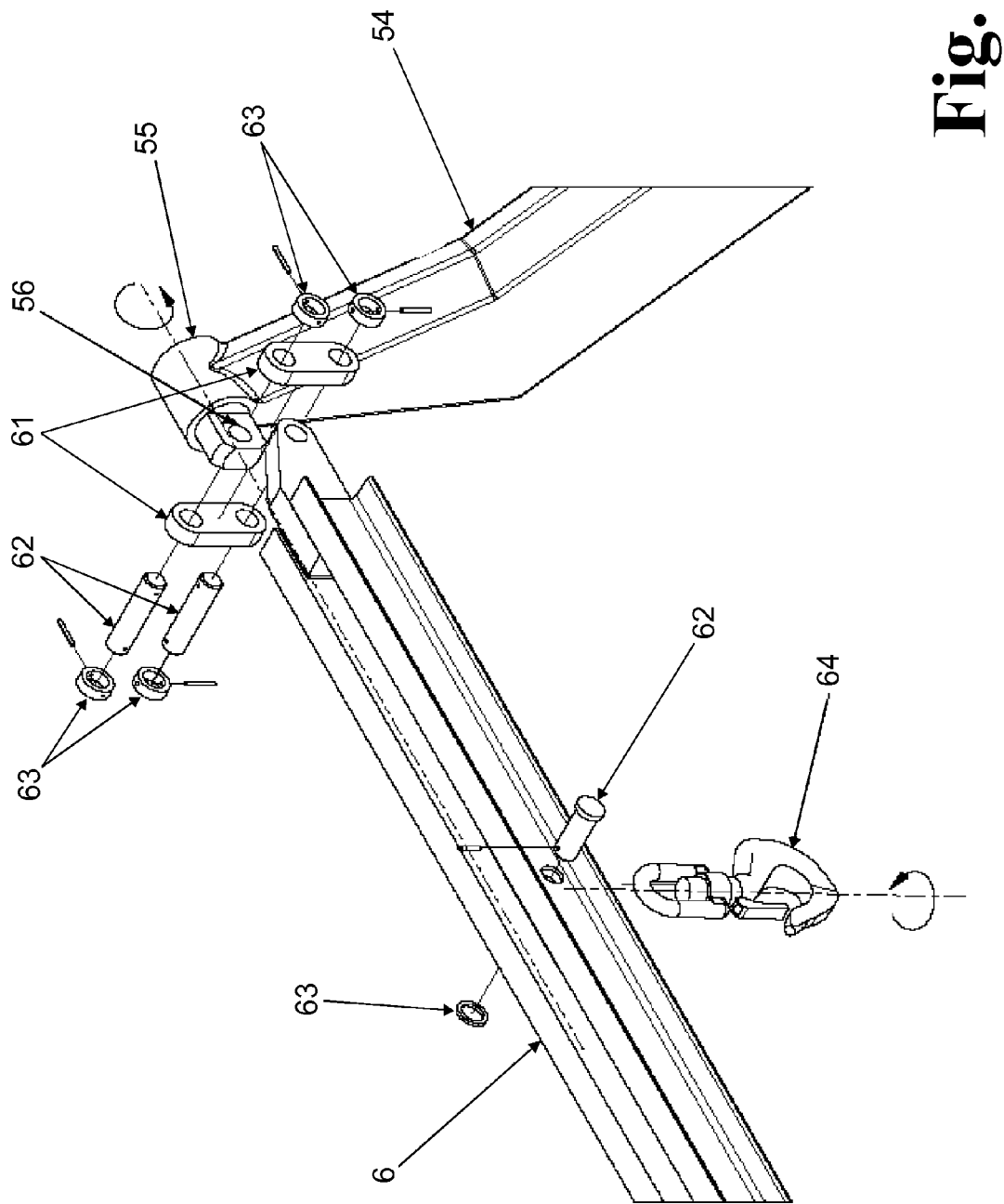
FIG. 6 the basic construction of the cross member and the fastening thereof to the ends of the boom.

As is shown in FIG. 6, in the regions of the boom ends 54 located at the greatest distance from the swivel bearings 42, the telescopic boom 5 has in each instance a mounting stud 56 which is rotatably received in a bearing bush 55. The two mounting studs 56 project out of the boom ends 54 on the presenting side by half of their length received in the bearing bush 55. A pair of fastening lugs 61 provided with two holes are arranged at the protruding ends of the mounting studs 56. The hole spacing corresponds to approximately twice the diameter of the mounting stud 56. The connection to the mounting stud 56 is carried out by means of insertion arbors 62 which are prevented from slipping out by pinned retaining rings 63. The fastening lugs 61 are movably supported around the hole axes, all of which are oriented orthogonal to the axis of rotation of the mounting stud 56. The fastening lugs 61 face downward by gravity. The cross member 6 is received in the lower holes of the fastening lugs 61 so as to swing between the boom ends 54 around the axis of rotation of the mounting studs 56 and around the hole axes of the fastening lugs 61. The load hook 64 which is supported in the middle of the cross member 6 so as to be rotatable around its vertical axis is fastened orthogonal to the cross member 6.

As a result of the swinging suspension, the load hook 64 or the working machine 38 suspended from the load hook 64 always faces vertically downward during the swiveling movement of the telescopic boom 5 due to gravity. The working machine 38 can be rotated around its vertical axis at the load hook 64 which is rotatably received in the cross member 6 so that the disk wheels of the working machine 38 can be aligned with the rail system 22 of the loading platform 2 and the working machine 38 can be deposited on the rail system 22. The same applies to the depositing of the disk wheels of the working machine 38 on a track (not shown) which is provided in the vicinity of the loading platform 2 as the work site for use of the working machine.

For transporting the working machine 38, the loading platform 2 is rotated out of the loading position into the transporting position. Owing to the weight of a working machine 38 which is picked up with its center of gravity lying outside the axis of rotation 44 of the loading platform 2, bending forces can occur inside the base frame 4 of the loading platform 2, as a result of which the front region of the loading platform 2 located at the greatest distance from the axis of rotation 44 occupies a position which is too low relative to the chassis 1 so that it would no longer be possible to rotate the loading platform 2 inward into the transporting position.

In order to carry out this inward rotation in spite of this, two running rollers 46 are located in the front region of the base frame 4 at the underside thereof, which running rollers 46 can be positioned on the running surface 18 on the opposing chassis 1. The running surface 18 is fastened to the chassis 1 orthogonal to the driving direction 8. The running surface 18 is provided with lateral runup ramps 19 so that the running rollers 46 can reach the level of the running surface 18 from a lower position. Accordingly, the running rollers 46 allow an unobstructed inward rotation of the loading platform 2 and support the loading platform 2 on the running surface 18 in the transporting position.

When the transporting position is reached, the loading platform 2 is locked against rotation by inserting the securing pin 45 into the pin bearing 15 fastened to the carrier plate 12. This also reduces load on the fluid motor 14. In transporting position, the rail system 22 of the loading platform 2 is aligned exactly with the rail system 22 of the loading surface 3. A working machine 38 received on the loading platform 2 can be maneuvered onto the loading surface 3 from the loading platform 2. Accordingly, depending on the capacity of the loading surface 3 or the size of the working machine 38, additional working machines 38 or articles 39 can be received.

REFERENCE NUMERALS 1 chassis
10 longitudinal member of the chassis
11 chassis center plane
12 carrier plate
13 drive pinion
14 drive motor
15 pin bearing
16 lateral support
17 supporting feet
18 running surface
19 runup ramp
2 loading platform
21 depositing surface
22 rail system
23 depositing bar
3 loading surface
31 cover
32 function unit
33 energy unit
34 drive unit
35 control unit
36 operator unit
37 remote control
38 working machine
39 article
4 base frame
40 longitudinal member
41 bearing block
42 swivel bearing
43 gear ring
44 rotation axis
45 securing pin
46 running roller
47 rear support
5 telescopic boom
51 swivel axle
52 telescopic arm
53 fitting
54 boom end
55 bearing bush
56 mounting stud
57 swivel cylinder
58 maximum height
59 curved path
6 cross member
61 fastening lug
62 insertion arbor
63 retaining ring
64 load hook
7 displacement measuring unit
71 measuring cable
72 cable clamp
73 protective plate
74 adjusting range
8 driving direction
φ swiveling angle

What is claimed is:

1. A truck having a multi-axle chassis for transporting, depositing and picking up an article, comprising:
    a rear region with a rotatable loading platform with a gear ring for rotation of the loading platform, wherein a pinion gear of a drive motor rigidly fastened to the chassis is in a meshing engagement with the gear ring for rotation of the loading platform around a vertical axis of rotation; and
    a swivelable telescopic boom on the rotatable loading platform, wherein the swivelable telescopic boom has a horizontal swivel axle, two telescopic arms, a rotatably supported cross member connected at each end by a bearing to each of the telescopic arms, and a load hook in the center of the cross member, wherein the load hook has a bearing support which is freely rotatable around an axis orthogonal to the cross member;
    wherein a loading surface is located in front of the rotatable loading platform and located on a same level as the rotatable loading platform, the loading surface being outfitted with a longitudinal loading system for transporting the article from the loading platform to the loading surface and for transporting the article from the loading surface to the loading platform, and wherein the rotatable loading platform has a control unit for limiting a movement space of the telescopic boom during a swiveling movement around the horizontal swivel axle of the telescopic boom, wherein the limiting of the movement space is automatically adjusted for every swiveling angle to at least a predefined maximum height of the telescopic boom during its swiveling movement.

2. The truck according to claim 1, wherein the drive motor for rotation of the loading platform is a fluid motor.

3. The truck according to claim 1, wherein the drive motor for rotation of the loading platform is an electric motor.

4. The truck according to claim 1, further comprising displacement measuring units for monitoring the maximum height in the movement space of the telescopic boom, in each case, provided at linear-movably correlated parts of each of the telescopic arms and of linearly driving swivel cylinders for the swiveling movement of the telescopic arms.

5. The truck according to claim 1, further comprising displacement measuring units for sensing an extension length of the telescopic boom located at a moving boom end of each of the telescopic arms, and further comprising displacement measuring units for sensing a swiveling angle of the telescopic boom located at a linearly moving part of each of the swivel cylinders of the telescopic arms.

6. The truck according to claim 1, wherein the loading surface and the loading platform have a mutually merging rollable loading system for moving the article.

7. The truck according to claim 1, wherein the rollable loading system of loading surface and the loading platform comprises a mutually merging track rail system for a longitudinal movement of the article.

8. The truck according to claim 1, wherein the chassis has an energy unit for an autonomous operation of the loading platform, wherein the energy unit is a power generator for electrical operation of a hydraulic drive unit.

9. The truck according to claim 1, wherein the chassis has an energy unit for an autonomous operation of the loading platform, wherein an internal combustion engine of the truck can be used as the energy unit for operating a hydraulic drive unit.

10. The truck according to claim 1, wherein the chassis has an energy unit for an autonomous operation of the loading platform, wherein the energy unit is a power generator for operating an electric drive to implement a rotational movement of the loading platform.

11. The truck according to claim 1, wherein the control unit for limiting the movement space for the telescopic boom is additionally provided with a position computation based upon an angle length control and an angle length storage for depositing and picking up the article in an area surrounding the truck.

12. The truck according to claim 1, further comprising a memory unit provided for storing series of a depositing or pickup position, extension lengths of the telescopic arm correlated to swiveling angles in observing the predetermined maximum height, and a depositing or pickup position on the loading platform, wherein positions, angles, and lengths stored in the memory unit can be used to retrace a stored sequence of movements in a simple robotic manner for a subsequent sequence of movements of the article.

13. The truck according to claim 2, wherein the control unit of the loading platform has a remote control configured with an operator control for all movement functions.

14. The truck according to claim 2, further comprising a supporting device for stabilizing the chassis in the region of the loading platform during loading and unloading the article, the supporting device being located at the chassis below the loading platform, wherein the supporting device has vertically adjustable supporting feet which can be moved out from each side of the chassis.

15. A truck for transporting, depositing and picking up an article, the truck comprising:
- a semitrailer with a chassis supported by three or more axles having wheels attached;
- a rear region having, on the chassis, a rotatable loading platform with a gear ring for rotation of the loading platform, wherein a pinion gear of a drive motor rigidly fastened to the chassis is in a meshing engagement with the gear ring for rotation of the loading platform around a vertical axis of rotation;
- a swivelable telescopic boom on the rotatable loading platform, wherein the swivelable telescopic boom has a horizontal swivel axle at a back end of the loading platform, two linear telescopic arms each equipped with a linear drive borne at a front end and extended over a side area of the loading platform for swiveling the telescopic arms, a rotatably supported cross member connected at each end by a bearing to each of the telescopic arms, and a single load hook located at a center of the cross member, wherein the load hook has a bearing support which is freely rotatable around an axis orthogonal to the cross member; and
- a loading surface being located in front of the rotatable loading platform and being adapted to a same level as the rotatable loading platform above the chassis, the loading surface being outfitted with a longitudinal loading system for guided/aligned transporting the article from the loading platform to the loading surface and for transporting the article from the loading surface to the loading platform.

\* \* \* \* \*